(12) United States Patent
Mather et al.

(10) Patent No.: US 11,541,730 B2
(45) Date of Patent: Jan. 3, 2023

(54) REMOVABLE LIFTGATE FLIPPER GLASS WITH DETACHABLE HINGE

(71) Applicants: Carl Mather, Lake Orion, MI (US); Dorinel Neag, Commerce Township, MI (US)

(72) Inventors: Carl Mather, Lake Orion, MI (US); Dorinel Neag, Commerce Township, MI (US)

(73) Assignee: FCA US LLC, Auburn Hills, MI (US)

( * ) Notice: Subject to any disclaimer, the term of this patent is extended or adjusted under 35 U.S.C. 154(b) by 85 days.

(21) Appl. No.: 17/125,309

(22) Filed: Dec. 17, 2020

(65) Prior Publication Data
US 2022/0194184 A1 Jun. 23, 2022

(51) Int. Cl.
*B60J 1/18* (2006.01)
*B60J 1/00* (2006.01)
*B60J 1/20* (2006.01)

(52) U.S. Cl.
CPC ............. *B60J 1/1823* (2013.01); *B60J 1/004* (2013.01); *B60J 1/20* (2013.01)

(58) Field of Classification Search
CPC . B60J 1/1823; B60J 1/004; B60J 5/101; B60J 1/14; B60J 1/1876; B60J 1/1892; B60J 5/106
USPC .............................. 296/146.15, 96.2, 56, 106
See application file for complete search history.

(56) References Cited

U.S. PATENT DOCUMENTS

| | | | |
|---|---|---|---|
| 5,015,028 A | 5/1991 | Bonnett | |
| 5,076,635 A * | 12/1991 | Larkin | B60J 1/1884 296/146.16 |
| 6,317,925 B1 * | 11/2001 | Pietryga | E05D 11/0054 16/250 |
| 7,748,765 B2 * | 7/2010 | Byrnes | E05D 11/0081 219/203 |
| 8,764,095 B2 | 7/2014 | Ritzinger et al. | |
| 8,991,898 B2 | 3/2015 | Iwano | |
| 10,501,008 B2 | 12/2019 | Snider | |
| 10,533,357 B1 * | 1/2020 | Mitchell | B60J 1/1884 |
| 2005/0194814 A1 * | 9/2005 | Willis | B60J 5/108 296/146.1 |
| 2008/0231072 A1 | 9/2008 | Franco et al. | |

(Continued)

FOREIGN PATENT DOCUMENTS

| | | | | |
|---|---|---|---|---|
| DE | 19849915 A1 * | 5/2000 | | B60J 5/105 |
| EP | 1184218 B1 | 1/2007 | | |
| FR | 2843606 A1 * | 2/2004 | | B60J 5/103 |

*Primary Examiner* — D Glenn Dayoan
*Assistant Examiner* — Kevin P Weldon
(74) *Attorney, Agent, or Firm* — Ralph E. Smith

(57) ABSTRACT

A detachable hinge assembly configured to rotatably couple a window assembly to a vehicle body includes a support hinge member configured to couple to the vehicle body and including a hinge pin, and a window hinge member having a main body configured to couple to the window assembly, and one or more knuckles configured to removably receive the hinge pin. A cover is rotatably coupled to the window hinge member and includes a pin retaining arm. The cover is configured to move between a closed position where the pin retaining arm is positioned to retain the hinge pin within the one or more knuckles, and an open position where the pin retaining arm is positioned to allow the hinge pin to be removed from the one or more knuckles.

19 Claims, 7 Drawing Sheets

(56) References Cited

U.S. PATENT DOCUMENTS

2009/0167053 A1\* 7/2009 Walker .................... B60J 5/101
  296/180.1
2013/0278004 A1\* 10/2013 Sackett ............. B62D 33/0273
  296/57.1
2015/0028395 A1  1/2015 Horkheimer et al.

\* cited by examiner

REMOVABLE LIFTGATE FLIPPER GLASS WITH DETACHABLE HINGE

FIELD

The present application relates generally to vehicle windows and, more particularly, to a vehicle with a liftgate flipper glass removably coupled to the vehicle by a detachable hinge.

BACKGROUND

Some motor vehicles include a rear liftgate rotatably coupled to a rear of the vehicle. The rear liftgate is typically movable between a closed position that covers a rear opening of the vehicle, and an open position that allows access to a rear cargo area. In some vehicles, the rear liftgate includes a flipper glass or rear window that is separately pivotable between open and closed positions to provide alternative access to and closure of the rear cargo area. However, the rear windows are typically manufactured to be permanently attached to the vehicle and thus are not removable. Accordingly, while such flipper glass systems work well for their intended purpose, it is desirable to provide improvements in the relevant art.

SUMMARY

In accordance with one example aspect of the invention, a detachable hinge assembly configured to rotatably couple a window assembly to a vehicle body is provided. In one example implementation, the detachable hinge assembly includes a support hinge member configured to couple to the vehicle body and including a hinge pin, and a window hinge member having a main body configured to couple to the window assembly, and one or more knuckles configured to removably receive the hinge pin. A cover is rotatably coupled to the window hinge member and includes a pin retaining arm. The cover is configured to move between a closed position where the pin retaining arm is positioned to retain the hinge pin within the one or more knuckles, and an open position where the pin retaining arm is positioned to allow the hinge pin to be removed from the one or more knuckles.

In addition to the foregoing, the described detachable hinge assembly may include one or more of the following features: a lock assembly configured to move between a locked position that secures the cover in the closed position, and an unlocked position that enables the cover to move from the closed position to the open position; and wherein the lock assembly includes a lock lever disposed on a back side of the main body and a latch disposed on a front side of the main body opposite the back side, wherein the lock lever is operably coupled to the latch such that rotation of the lock lever between a first position and a second position correspondingly moves the latch between a latched condition with the cover and an unlatched condition with the cover.

In addition to the foregoing, the described detachable hinge assembly may include one or more of the following features: wherein the lock lever is coupled to the latch by a shaft such that rotation of the lock lever between the first and second positions rotates the latch between the latched and unlatched conditions; wherein the cover includes an inside surface having a locking tab extending therefrom, the latch configured to engage the locking tab when the cover is in the closed position and the lock assembly is in the locked position; a release button assembly configured to releasably secure the cover to the window hinge member; and wherein the release button assembly includes a housing defining an aperture configured to slidingly receive a release button, which is configured to move between an extended position that engages the cover to facilitate preventing opening thereof, and a retracted position that does not engage the cover to enable opening of the cover.

In addition to the foregoing, the described detachable hinge assembly may include one or more of the following features: wherein the support hinge member further includes a main support plate and at least one support flange extending therefrom, wherein the hinge pin is coupled to the support flange and includes an intermediate portion disposed between two opposed ends; and wherein the pin retaining arm is disposed at least partially about the intermediate portion.

In accordance with another example aspect of the invention, a vehicle is provided. In one example implementation, the vehicle includes a body and a flipper glass assembly rotatably and removably coupled to the body by a detachable hinge assembly. The detachable hinge assembly includes a support hinge member coupled to the vehicle body and including a hinge pin, a flipper hinge member having a main body coupled to the vehicle, and one or more knuckles configured to removably receive the hinge pin, and a cover rotatably coupled to the flipper hinge member and including a pin retaining arm. The cover is configured to move between a closed position where the pin retaining arm is positioned to retain the hinge pin within the one or more knuckles, and an open position where the pin retaining arm is positioned to allow the hinge pin to be removed from the one or more knuckles.

In addition to the foregoing, the described vehicle may include one or more of the following features: wherein the detachable hinge assembly further comprises a lock assembly configured to move between a locked position that secures the cover in the closed position, and an unlocked position that enables the cover to move from the closed position to the open position, wherein when the flipper glass assembly is in a closed position, at least a portion of the lock assembly is disposed in an interior of the vehicle to facilitate preventing unauthorized access to the lock assembly, and wherein when the flipper glass assembly is moved to an open position, the lock assembly is accessible to facilitate removal of the flipper glass assembly from the vehicle body.

In addition to the foregoing, the described vehicle may include one or more of the following features: wherein the lock assembly includes a lock lever disposed on a back side of the main body, and a latch disposed on a front side of the main body opposite the back side, wherein the lock lever is operably coupled to the latch such that rotation of the lock lever between a first position and a second position correspondingly moves the latch between a latched condition with the cover and an unlatched condition with the cover; wherein the lock lever is coupled to the latch by a shaft such that rotation of the lock lever between the first and second positions rotates the latch between the latched and unlatched conditions; and wherein the cover includes an inside surface having a locking tab extending therefrom, the latch configured to engage the locking tab when the cover is in the closed position and the lock assembly is in the locked position.

In addition to the foregoing, the described vehicle may include one or more of the following features: a release button assembly configured to secure the cover to the flipper hinge member; wherein the release button assembly includes a housing defining an aperture configured to slidingly receive a release button, which is configured to move between an extended position that engages the cover to facilitate preventing opening thereof, and a retracted position that does not engage the cover to enable opening of the cover; wherein the support hinge member further includes a main support plate and at least one support flange extending therefrom, wherein the hinge pin is coupled to the support flange and includes an intermediate portion disposed between two opposite ends; wherein the pin retaining arm is disposed at least partially about the intermediate portion; and wherein the flipper glass assembly is rotatably and removably coupled to a hard top assembly that is configured to be removably coupled to the vehicle body.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present application, systems and methods are described for vehicle convertible top systems. In the example embodiments, the convertible top system includes a removable rear hatch glass or flipper glass, which provides a user with the benefit of open air driving while affording available protection in the event of adverse weather conditions. The flipper glass is pivotably and removably coupled to the vehicle by a detachable hinge assembly, which advantageously includes security features that are only accessible after unlocking the car and opening the flipper glass, thereby facilitating prevention of unauthorized removal.

Figure 1:
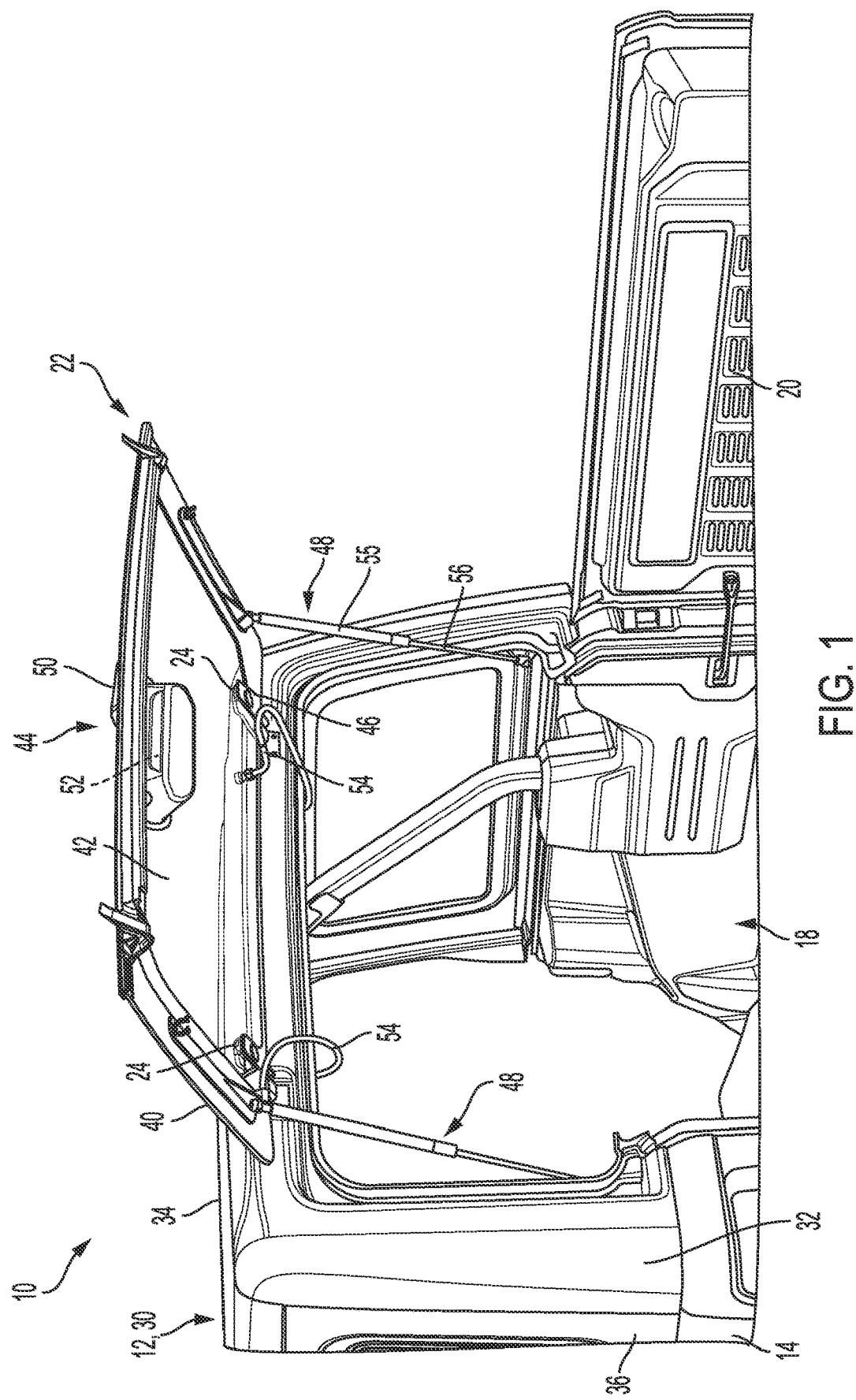
FIG. 1 is a rear perspective view of a vehicle with an example removable flipper glass assembly in accordance with the principles of the present disclosure.

With initial reference to FIG. 1, a vehicle 10 having a convertible top system 12 in accordance with the principles of the present disclosure is illustrated. In the example embodiment, the vehicle 10 generally includes a vehicle body 14, an interior with front and rear passenger seating (not shown), and a rear cargo area 18 at least partially enclosed by a tailgate 20 and a rear hatch glass or flipper glass assembly 22. In the example embodiment, the flipper glass assembly 22 is rotatably coupled to the convertible top system 12 by a detachable hinge assembly 24, which enables selective removal of the flipper glass assembly 22 from the convertible top system 12, as described herein in more detail. It will be appreciated, however, that removable flipper glass assembly 22 and/or detachable hinge assembly 24 are not limited to the illustrated configuration and may be incorporated into various vehicles, liftgates, tailgates, closure devices, structures, etc.

With continued reference to FIG. 1, in the example embodiment, the convertible top system 12 is a multi-component hard top assembly 30 that generally includes a base structure or frame 32 configured to removably receive a plurality of removable roof panels 34, removable quarter windows 36, and the removable flipper glass assembly 22. FIG. 1 illustrates the vehicle 10 with the hard top assembly 30 assembled onto the vehicle body 14. If desired, a user can remove the hard top assembly 30 from the vehicle body 14. In this way, the hard top assembly 30 enables the ability to create an open air experience by removing the roof panels 34, quarter windows 36, the flipper glass assembly 22, and/or the hard top assembly 30 altogether. Unlike a single piece assembly, the hard top assembly 30 includes multiple separately removable panels/windows/components that enable a single person to easily convert the vehicle 10 from an enclosed configuration (hard top assembly attached) to an open-air configuration (hard top assembly, or portions thereof, removed).

In the example embodiment, vehicle 10 is illustrated with the rear cargo area 18 configured to be selectively enclosed by the tailgate 20 and the rear flipper glass assembly 22, each of which is movable between an open position (FIG. 1) and a closed position (not shown). In the illustrated example, the flipper glass assembly 22 generally includes a frame 40, a glass window 42, a rear wiper assembly 44, an electrical wiring assembly 46, and at least one strut mount 48. The frame 40 is configured to receive and support the glass window 42 and is rotatably and removably coupled to the hard top frame 32 by the detachable hinge assembly 24. The rear wiper assembly 44 includes a rear window wiper 50 operably coupled to a motor 52, and one or more washer fluid lines 54 configured to supply washer fluid to the glass window 42 for cleaning thereof. The electrical wiring assembly 46 is configured to provide electrical power to the flipper glass assembly 22, for example, to power motor 52 or resistive conductors in the glass window 42. The strut mounts 48 include an upper strut 55 and a lower strut 56. The upper strut 55 is rotatably coupleable to the frame 40, and the lower strut 56 is removably coupled to the hard top frame 32, as shown in FIG. 2.

Figure 2:
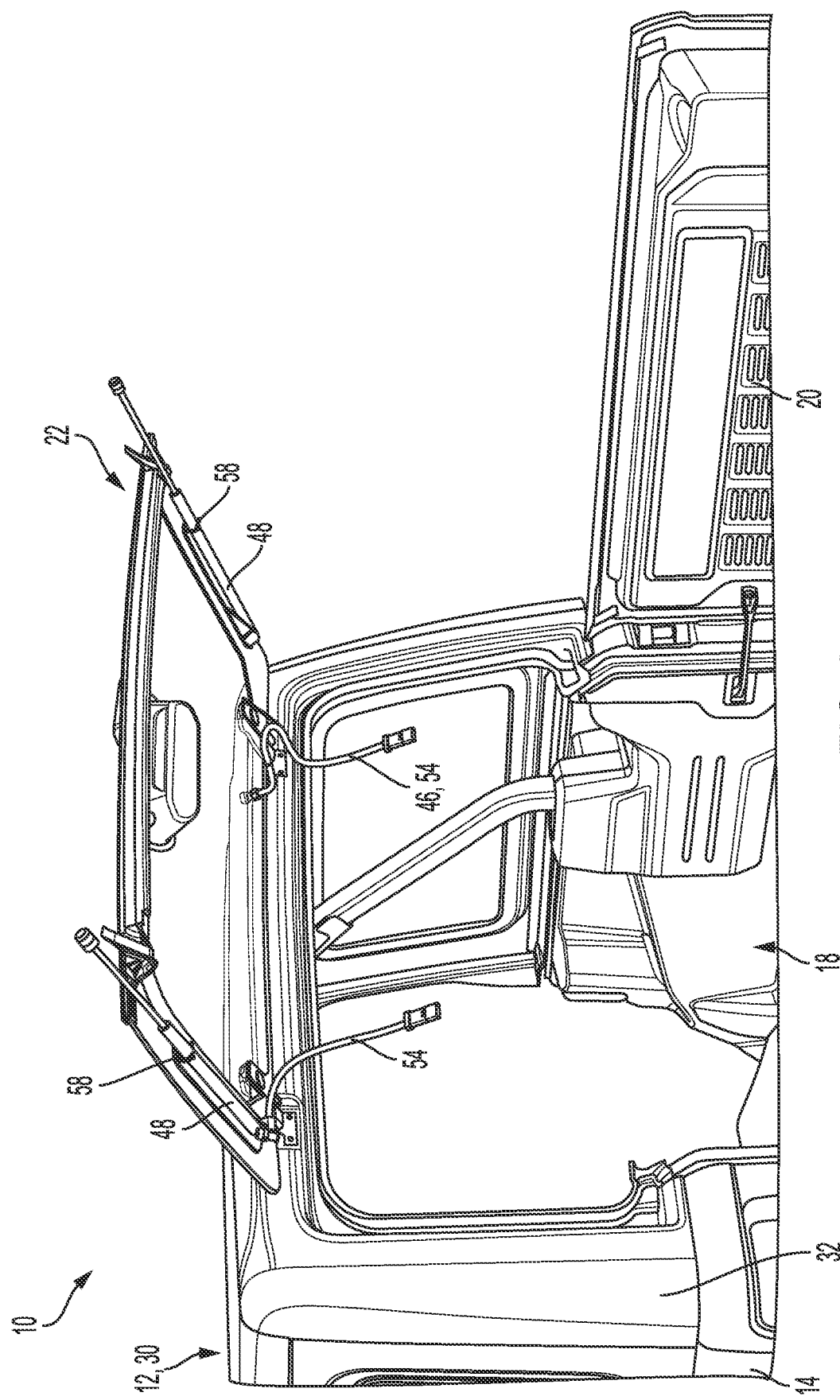
FIG. 2 is another rear perspective view of the vehicle and flipper glass assembly shown in FIG. 1 in accordance with the principles of the present disclosure.
Figure 3:
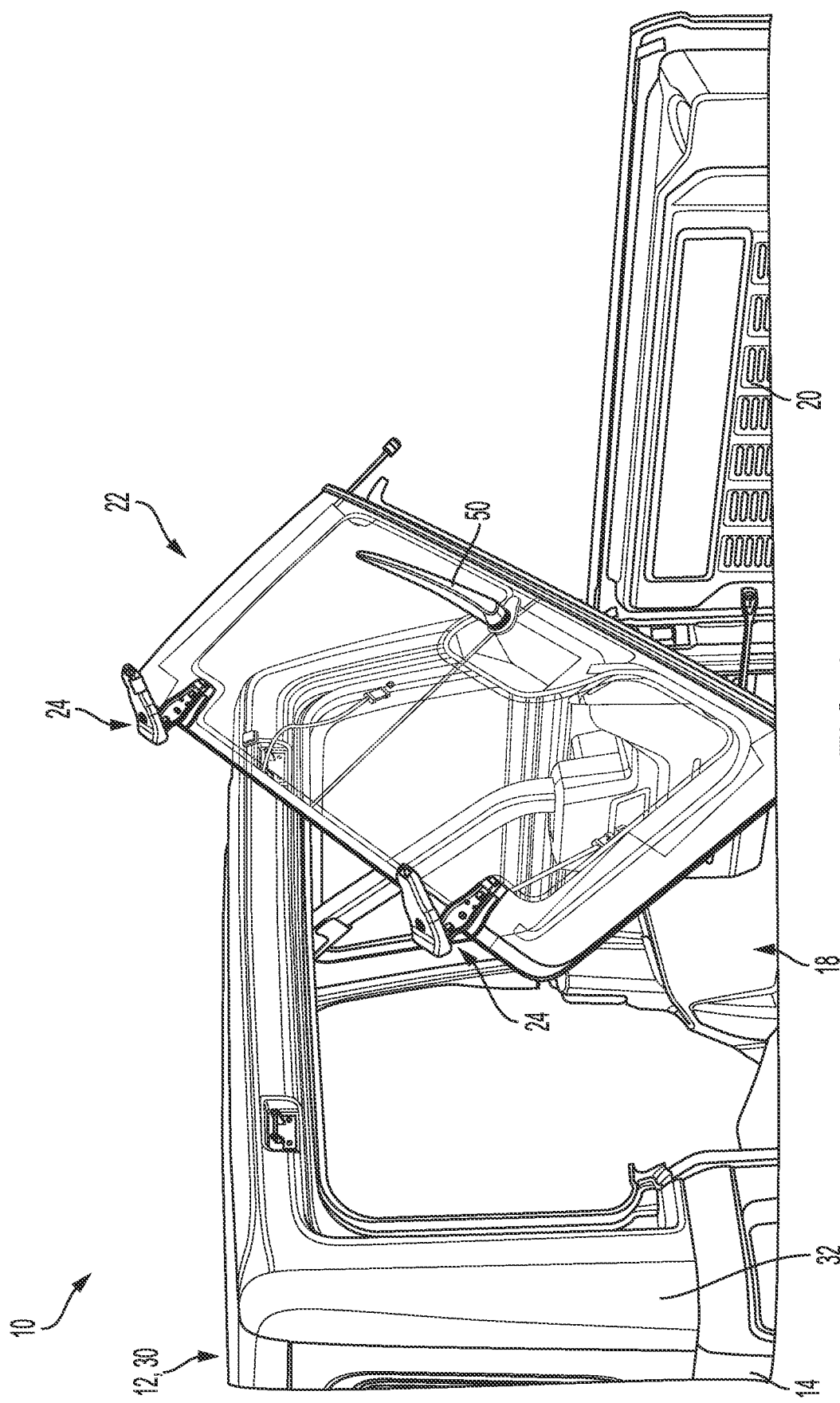
FIG. 3 is rear perspective view of the vehicle with the flipper glass assembly removed, in accordance with the principles of the present disclosure.

With additional reference to FIGS. 1-3, when it is desired to remove the flipper glass assembly 22 from the vehicle 10, the flipper glass assembly 22 is moved to the open position shown in FIG. 1. The washer fluid lines 54 and the electrical wiring assembly 46 are then disconnected from the vehicle 10, as shown in FIG. 2. Additionally, the lower struts 56 are detached from the hard top frame 32, rotated upwards toward the frame 40, and subsequently secured to the frame 40 via a retention device 58 (e.g., a clip). As shown in FIG. 3, the hinge assembly 24 is then detached from the hard top frame 32, and the flipper glass assembly 22 is removed from the vehicle 10 for subsequent storage, as described herein in more detail.

With reference now to FIGS. 4-11, the detachable hinge assembly 24 will be described in more detail. In the example embodiment, the detachable hinge assembly 24 generally includes a support hinge member 60, a flipper hinge member 62, a cover 64, a lock assembly 66, and a release button assembly 68.

Figure 11:
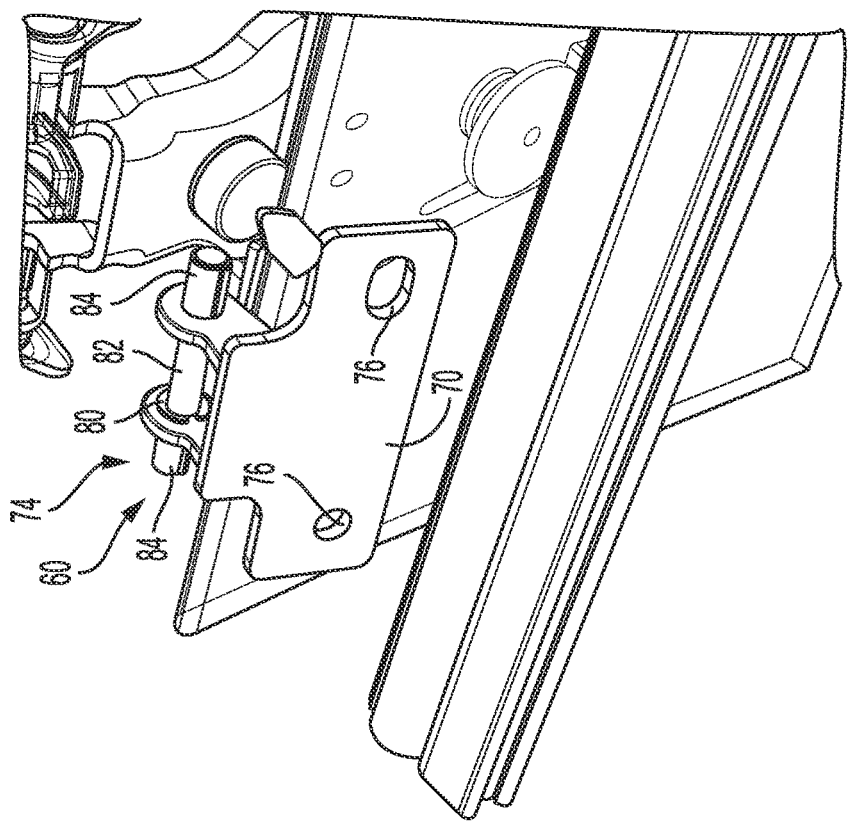
FIG. 11 is a rear perspective view of the detachable hinge assembly shown in FIG. 10, in accordance with the principles of the present disclosure.
Figure 10:
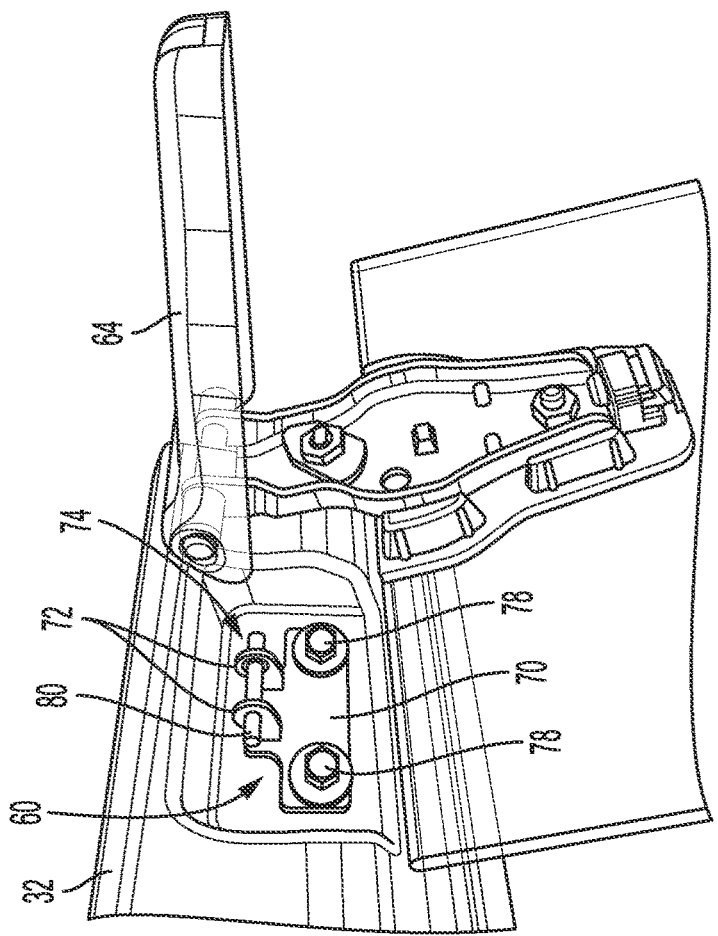
FIG. 10 is a front perspective view of the detachable hinge assembly shown in FIG. 4 detached from the vehicle, in accordance with the principles of the present disclosure.

As shown in FIGS. 10 and 11, in the example embodiment, the support hinge member 60 is configured to couple to the hard top frame 32 and generally includes a main support plate 70, one or more support flanges 72, and a hinge pin 74. The main support plate 70 includes one or more apertures 76 (FIG. 11) configured to each receive a fastener 78 (FIG. 10) for coupling the main support plate 70 to the hard top frame 32. The support flanges 72 extend outwardly from the main support plate 70 and include apertures 80. The hinge pin 74 is inserted into the flange apertures 80 and includes an intermediate portion 82 disposed between opposed ends 84, which are configured to rotatably support the flipper hinge member 62.

Figure 6:
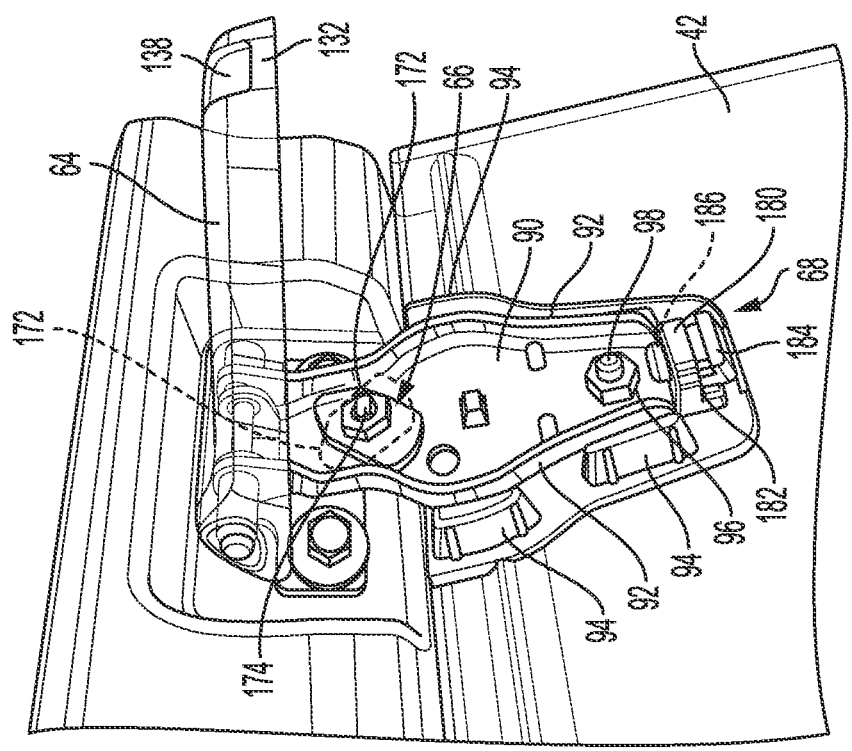
FIG. 6 is a front perspective view of the detachable hinge assembly shown in FIG. 4 in an uncoupled position, in accordance with the principles of the present disclosure.

As shown in FIGS. 6-9, in the example embodiment, the flipper hinge member 62 generally includes a main body 90 with opposed flanges 92, spacers 94, and knuckles 96 extending outwardly therefrom. A first aperture 96 is formed in the main body 90 and is configured to receive a fastener 98 (e.g., bolt with nut) for securing the flipper hinge member 62 to the frame 40 and/or window 42 (e.g., see FIGS. 6 and 11). A second aperture 100 is formed in the main body 90 (e.g., see FIG. 8) and is configured to receive at least a portion of the lock assembly 66 therethrough (e.g., see FIG. 6). The opposed flanges 92 provide structural rigidity to the flipper hinger member 62 and also support the knuckles 96. The spacers 94 extend outwardly from the main body 90 and are configured to provide support for the cover 64 when in a closed position (FIG. 6).

Figure 5:
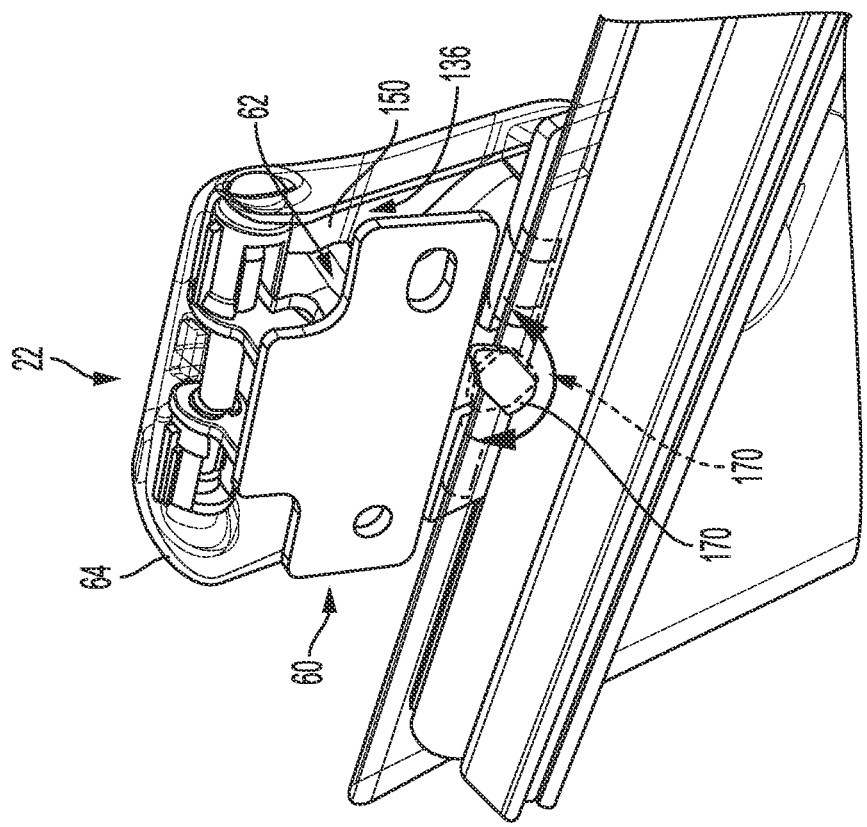
FIG. 5 is a rear perspective view of the detachable hinge assembly shown in FIG. 4, in accordance with the principles of the present disclosure.
Figure 9:
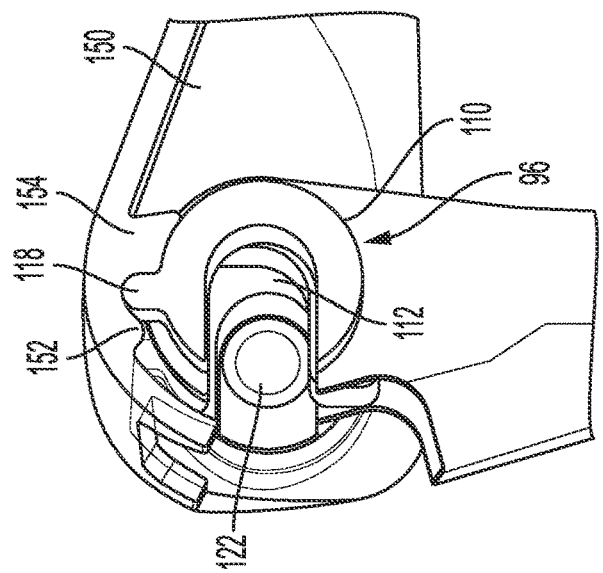
FIG. 9 is a sectional view of the portion of the detachable hinge assembly shown in FIG. 8 and taken along 9-9, in accordance with the principles of the present disclosure.
Figure 8:
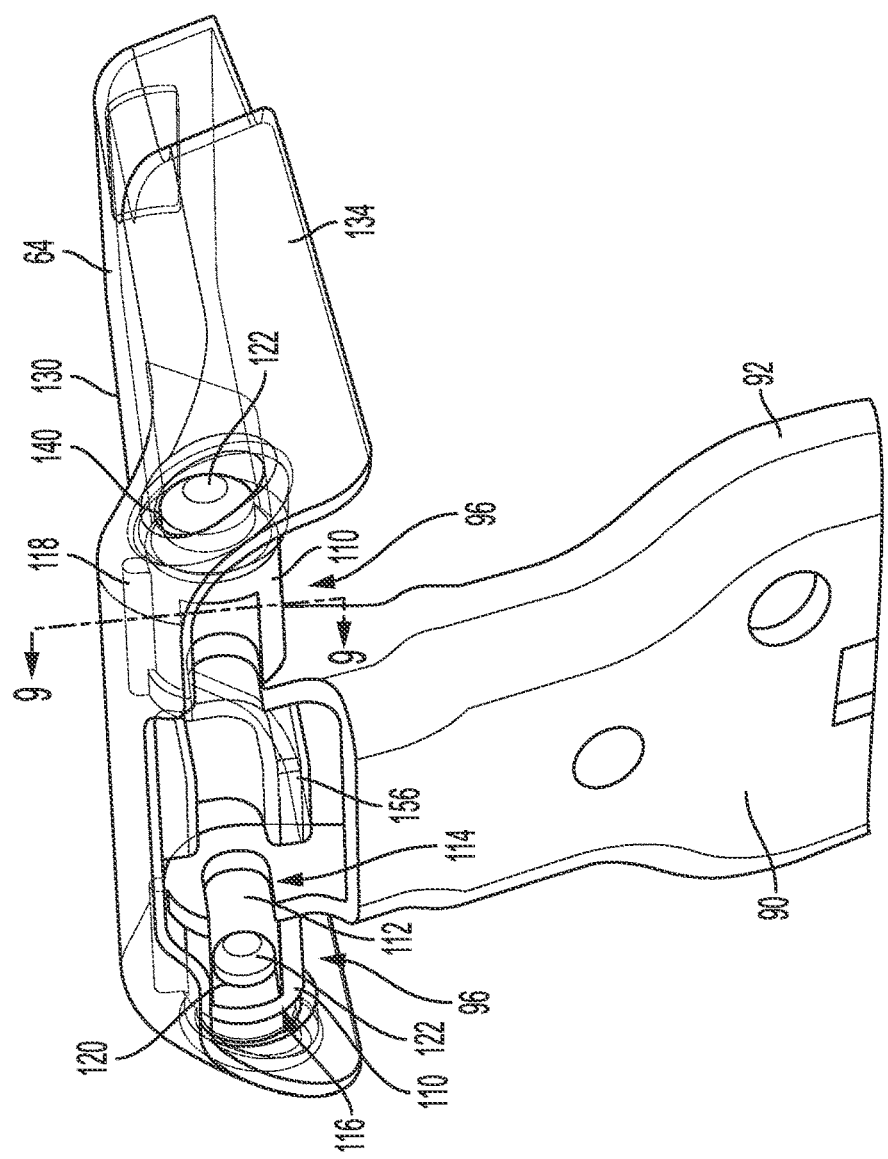
FIG. 8 is a rear perspective view of a portion of the detachable hinge assembly shown in FIG. 6, in accordance with the principles of the present disclosure.

In the illustrated example shown in FIGS. 8 and 9, the knuckles 96 include opposed generally cylindrical members 110 each defining a partially open slot 112 extending between an inboard open end 114 and an outboard closed end 116. Each cylindrical member 110 also includes an outwardly extending projection 118 configured to interact with the cover 64 to control opening thereof. The outboard closed ends 116 include an aperture 120 configured to receive pin 122 for rotatably coupling cover 64 to the flipper hinge member 62, as described herein in more detail. As shown in FIG. 5, the partially open slots 112 are configured to removably receive the hinge pin 74 of the support hinge member 60.

In the example embodiment, cover 64 is configured to move between a closed position (FIG. 4) covering and enclosing the flipper hinge member 62, and an open position (FIG. 6) that enables the flipper hinge member 62 to disengage from the support hinge member 60. In the illustrated embodiment, cover 64 generally includes a main body 130 having a bottom wall 132 and a pair of side walls 134 extending therefrom to define a cavity 136 (FIG. 5) to receive the flipper hinge member 62. The bottom wall 132 defines a receiving aperture 138 configured to receive the release button assembly 68 (e.g., see FIG. 4), and an opposite end of the side walls 134 define opposed apertures 140 configured to receive the pins 122 for rotatably coupling the cover 64 to the flipper hinge member 62 (e.g., see FIG. 8).

In the example implementation, an inner surface 150 of the cover main body 130 includes various features for interacting with portions of the detachable hinge assembly 24. Specifically, inner surface 150 includes a detent 152 and stop 154, a pin retaining arm 156 (FIG. 8), and a locking tab 158 (FIG. 7) extending inwardly therefrom into the cover cavity 136. As shown in FIG. 9, the detent 152 is configured to engage the cylindrical member projection 118 to facilitate maintaining the cover 64 in the open position, and stop 154 is configured to engage cylindrical member projection 118 to prevent rotation of cover 64 beyond a predetermined rotation angle.

Figure 7:
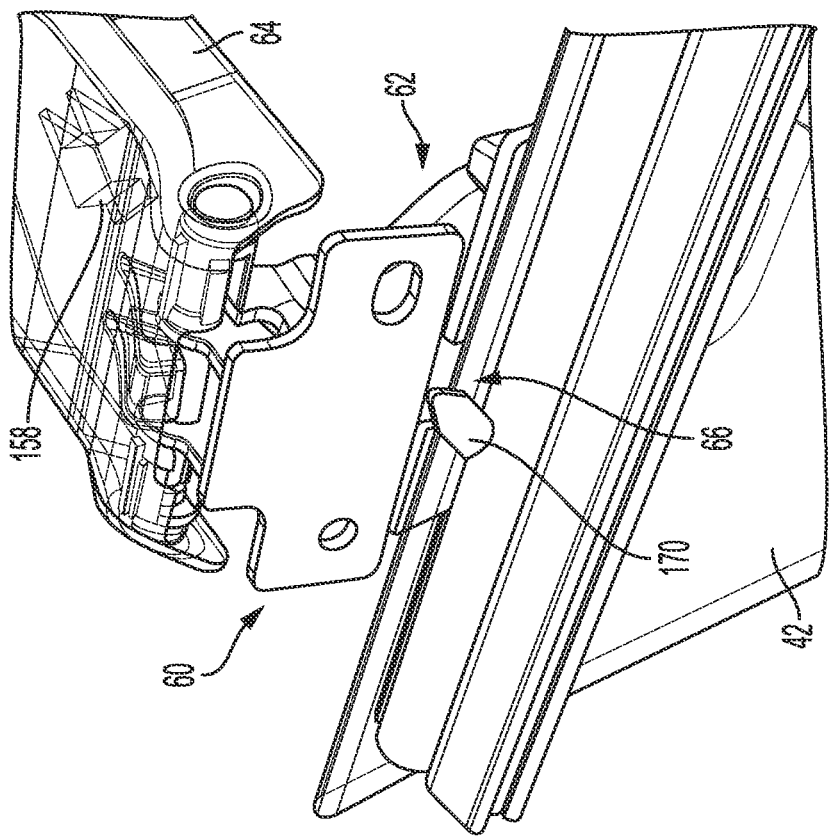
FIG. 7 is a rear perspective view of the detachable hinge assembly shown in FIG. 6, in accordance with the principles of the present disclosure.

In the example embodiment, the pin retaining arm 156 is a generally hook-like member configured to selectively engage the hinge pin intermediate portion 82. As shown in FIG. 5 with the cover 64 in the closed position, the pin retaining arm 156 is positioned to hook around the pin intermediate portion 82 to prevent removal of the hinge pin 74 from the knuckles 96, thus maintaining the flipper hinge member 62 hingedly coupled to the support hinge member 60. When cover 64 is rotated to the open position as shown in FIGS. 7 and 8, the pin retaining arm 156 is rotated away from the hinge pin 74, thereby enabling hinge pin 74 to be removed from the knuckles 96 and allowing flipper glass assembly 22 to be removed from the vehicle 10. As shown in FIGS. 7 and 10, the locking tab 158 is a generally hook-like member configured to be selectively engaged by the lock assembly 66 when the cover 64 is in the closed position, as described herein in more detail.

With continued reference to FIGS. 4-7, the lock assembly 66 will be described in more detail. The lock assembly 66 is configured to selectively engage the cover 64 to maintain it in the closed position to prevent unauthorized or unintended disengagement of the flipper hinge member 62 from the support hinge member 60. In the example embodiment, the lock assembly 66 generally includes a lock lever 170 rotatably coupled to a latch 172 by a shaft 174, which extends through the second aperture 100 formed in the main body 90.

As shown in FIG. 5, the lock lever 170 is movable between a locked position (shown in phantom) and an unlocked position (shown in solid). In the locked position, the latch 172 is oriented in a generally vertical latched position, as shown in FIG. 6 in phantom. In the latched position, the latch 172 is rotated to be disposed between the cover main body 130 and the locking tab 158. In this way, attempting to rotate the cover 64 from the closed position to the open position causes the hook-like locking tab 158 to engage the latch 172, thereby preventing opening of the cover 64 and subsequent detachment of flipper glass assembly 22.

Figure 4:
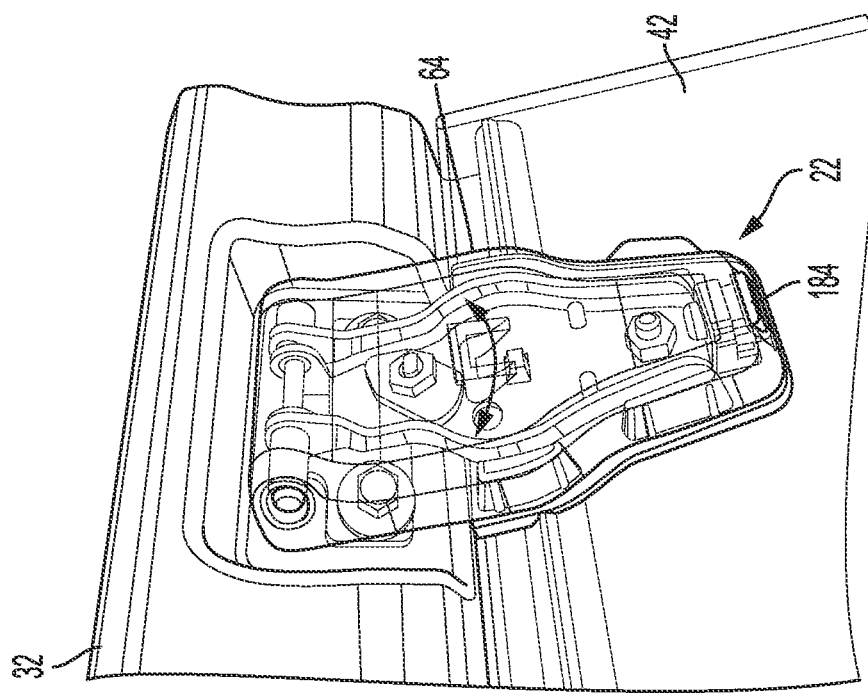
FIG. 4 is a front perspective view of an example detachable hinge assembly configured to removably couple the flipper glass assembly to the vehicle, in accordance with the principles of the present disclosure.

Moreover, when the flipper glass assembly 22 is in the closed position shown in FIGS. 4 and 5, the lock lever 170 is inaccessible from the exterior of the vehicle 10, thereby preventing unauthorized access to the lock lever 170. When the flipper glass assembly 22 is in the open position, the lock lever 170 can be rotated to the unlocked position, which rotates the latch 172 a predetermined amount such that latch 172 is oriented in an unlatched position, as shown in solid in FIG. 6. In this way, the latch 172 is no longer disposed between the cover main body 130 and the locking tab 158, thereby enabling opening of the cover 64 to the open position.

With continued reference to FIGS. 4 and 6, the release button assembly 68 will be described in more detail. The release button assembly 68 is configured to secure the cover 64 to the flipper hinge member 62 in the closed position and selectively release the cover 64 such that it can be moved to the open position. As shown in FIG. 6, in the example embodiment, the release button assembly 68 generally includes a housing 180 defining an aperture 182 configured to slidingly receive a release button 184. The housing 180 may be integrally formed with the flipper hinge member 62 and is configured to house a biasing mechanism 186 (e.g., a spring) configured to bias the release button 184 into an extended first position (FIG. 4). In this position, the release button 184 extends through the receiving aperture 138 formed in cover 64 and is positioned to engage the inner edge of cover bottom wall 132 that defines the aperture 138. This position prevents movement of the cover 64 to the open position. When the release button 184 is pressed into the housing 180 to a retracted second position (not shown), release button 184 is no longer disposed within the receiving aperture 138, thereby enabling rotation of the cover 64 to the open position.

In an example operation, the flipper glass assembly 22 and the cover 64 are in the closed positions, and the lock assembly 66 is in a locked condition preventing opening of the cover 64. In this position, the flipper glass assembly 22 is rotatably secured to the hard top assembly 30 and lock lever 170 is inaccessible from the exterior of the vehicle 10. More specifically, with the cover 64 closed and the lock lever 170 in the locked position, latch 172 is oriented in the latched position to engage locking tab 158 and thereby facilitate preventing opening of the cover 64. Additionally, in this position, the pin retaining arm 156 of cover 64 is located at least partially about the hinge pin 74 to facilitate preventing separation of the flipper hinge member 62 from the support hinge member 60, as shown in FIG. 5.

In order to remove the flipper glass assembly 22 from the vehicle, the flipper glass assembly 22 is moved to the open position (FIG. 1) and the washer fluid lines 54, electrical wiring assembly 46, and strut mounts 48 are disconnected from the vehicle 10. The strut mounts 48 are rotated upward and coupled to the frame 40 via the retention devices 58, as shown in FIG. 2.

With the flipper glass assembly 22 in the open position, the lock lever 170 is now accessible from a rear exterior of the vehicle 10. The user then rotates the lock lever 170 to the unlocked position, which simultaneously rotates latch 172 to the unlatched position away from locking tab 158. The user then depresses release button 184 to disengage the cover bottom wall 132, and rotates cover 64 upward until the detent 152 passes over the cylindrical member projection 118, which engages stop 154 to prevent further rotation, as shown in FIG. 9. Rotation of the cover 64 to the open position rotates the pin retaining arm 156 downward and out of its position to engage pin intermediate portion 82, as shown in FIGS. 7 and 8. At this point, the flipper hinge member 62 can separate from the support hinge member 60. The same steps are repeated for any additional hinge assemblies 24. With the hinge assemblies 24 detached, the flipper glass assembly 22 can then be removed from the vehicle 10.

Described herein are systems and methods for a vehicle having a flipper glass assembly rotatably and removably coupled to a hard top assembly of the vehicle by a detachable hinge assembly. The detachable hinge assembly includes a support hinge member coupled to the hard top assembly, and a flipper hinge member coupled to a flipper glass. A cover is rotatably coupled to the flipper hinge member and moves from a closed position that locks the flipper hinge member to the support hinge member, and an open position that unlocks the flipper hinge member from the support member for removal of the flipper glass assembly. For security purposes, a lock assembly selectively locks the cover in the closed position and is only accessible (or at least easily accessible) when the flipper glass is moved to an open position, to thereby facilitate preventing unauthorized removal of the flipper glass assembly from the vehicle.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A detachable hinge assembly configured to rotatably couple a window assembly to a vehicle body, the detachable hinge assembly comprising:
    a support hinge member configured to couple to the vehicle body and including a hinge pin;
    a window hinge member having a main body configured to couple to the window assembly, and one or more knuckles configured to removably receive the hinge pin; and
    a cover rotatably coupled to the window hinge member and including a pin retaining arm, the cover configured to move between a closed position that covers and encloses the window hinge member such that the pin retaining arm is positioned to retain the hinge pin within the one or more knuckles, and an open position where the pin retaining arm is positioned to allow the hinge pin to be removed from the one or more knuckles.

2. The detachable hinge assembly of claim 1, further comprising a lock assembly configured to move between a locked position that secures the cover in the closed position, and an unlocked position that enables the cover to move from the closed position to the open position.

3. The detachable hinge assembly of claim 2, wherein the lock assembly comprises:
    a lock lever disposed on a back side of the main body; and
    a latch disposed on a front side of the main body opposite the back side,
    wherein the lock lever is operably coupled to the latch such that rotation of the lock lever between a first position and a second position correspondingly moves the latch between a latched condition with the cover and an unlatched condition with the cover.

4. The detachable hinge assembly of claim 3, wherein the lock lever is coupled to the latch by a shaft such that rotation of the lock lever between the first and second positions rotates the latch between the latched and unlatched conditions.

5. The detachable hinge assembly of claim 3, wherein the cover includes an inside surface having a locking tab extending therefrom, the latch configured to engage the locking tab when the cover is in the closed position and the lock assembly is in the locked position.

6. The detachable hinge assembly of claim 1, further comprising a release button assembly configured to releasably secure the cover to the window hinge member.

7. The detachable hinge assembly of claim 6, wherein the release button assembly includes a housing defining an aperture configured to slidingly receive a release button, which is configured to move between an extended position that engages the cover to facilitate preventing opening thereof, and a retracted position that does not engage the cover to enable opening of the cover.

8. The detachable hinge assembly of claim 1, wherein the support hinge member further includes a main support plate and at least one support flange extending therefrom, wherein the hinge pin is coupled to the support flange and includes an intermediate portion disposed between two opposed ends.

9. The detachable hinge assembly of claim 8, wherein the pin retaining arm is disposed at least partially about the intermediate portion.

10. A vehicle comprising:
a body; and
a flipper glass assembly rotatably and removably coupled to the body by a detachable hinge assembly that includes:
a support hinge member coupled to the vehicle body and including a hinge pin;
a flipper hinge member having a main body coupled to the vehicle, and one or more knuckles configured to removably receive the hinge pin; and
a cover rotatably coupled to the flipper hinge member and including a pin retaining arm, the cover configured to move between a closed position that covers and encloses the flipper hinge member such that the pin retaining arm is positioned to retain the hinge pin within the one or more knuckles, and an open position where the pin retaining arm is positioned to allow the hinge pin to be removed from the one or more knuckles.

11. The vehicle of claim 10, wherein the detachable hinge assembly further comprises a lock assembly configured to move between a locked position that secures the cover in the closed position, and an unlocked position that enables the cover to move from the closed position to the open position, wherein when the flipper glass assembly is in a closed position, at least a portion of the lock assembly is disposed in an interior of the vehicle to facilitate preventing unauthorized access to the lock assembly, and
wherein when the flipper glass assembly is moved to an open position, the lock assembly is accessible to facilitate removal of the flipper glass assembly from the vehicle body.

12. The vehicle of claim 11, wherein the lock assembly comprises:
a lock lever disposed on a back side of the main body; and
a latch disposed on a front side of the main body opposite the back side,
wherein the lock lever is operably coupled to the latch such that rotation of the lock lever between a first position and a second position correspondingly moves the latch between a latched condition with the cover and an unlatched condition with the cover.

13. The vehicle of claim 12, wherein the lock lever is coupled to the latch by a shaft such that rotation of the lock lever between the first and second positions rotates the latch between the latched and unlatched conditions.

14. The vehicle of claim 12, wherein the cover includes an inside surface having a locking tab extending therefrom, the latch configured to engage the locking tab when the cover is in the closed position and the lock assembly is in the locked position.

15. The vehicle of claim 10, further comprising a release button assembly configured to secure the cover to the flipper hinge member.

16. The vehicle of claim 15, wherein the release button assembly includes a housing defining an aperture configured to slidingly receive a release button, which is configured to move between an extended position that engages the cover to facilitate preventing opening thereof, and a retracted position that does not engage the cover to enable opening of the cover.

17. The vehicle of claim 10, wherein the support hinge member further includes a main support plate and at least one support flange extending therefrom, wherein the hinge pin is coupled to the support flange and includes an intermediate portion disposed between two opposite ends.

18. The vehicle of claim 17, wherein the pin retaining arm is disposed at least partially about the intermediate portion.

19. The vehicle of claim 10, wherein the flipper glass assembly is rotatably and removably coupled to a hard top assembly that is configured to be removably coupled to the vehicle body.

* * * * *